United States Patent
Huang et al.

(10) Patent No.: US 7,689,417 B2
(45) Date of Patent: Mar. 30, 2010

(54) METHOD, SYSTEM AND APPARATUS FOR IMPROVED VOICE RECOGNITION

(75) Inventors: Yen-Son Paul Huang, Cupertino, CA (US); Bo-Ren Bai, Chia-Yi County (TW); Zhen Hou, Beijing (CN); Yaying Liu, Nanjing (CN); Hang Yu, Nanjing (CN); Ming Zhang, Cupertino, CA (US)

(73) Assignee: Fortemedia, Inc., Cupertino, CA (US)

( * ) Notice: Subject to any disclaimer, the term of this patent is extended or adjusted under 35 U.S.C. 154(b) by 805 days.

(21) Appl. No.: 11/469,893

(22) Filed: Sep. 4, 2006

(65) Prior Publication Data

US 2008/0059191 A1 Mar. 6, 2008

(51) Int. Cl.
*G10L 15/00* (2006.01)
(52) U.S. Cl. .................. 704/246; 704/260; 704/275; 379/88.02
(58) Field of Classification Search ................ 704/246, 704/260, 275; 379/88.02
See application file for complete search history.

(56) References Cited

U.S. PATENT DOCUMENTS

| | | | | |
|---|---|---|---|---|
| 5,864,810 | A | * | 1/1999 | Digalakis et al. ............ 704/255 |
| 6,018,568 | A | * | 1/2000 | Furman et al. ........... 379/93.15 |
| 6,078,885 | A | * | 6/2000 | Beutnagel .................... 704/258 |
| 6,917,919 | B2 | * | 7/2005 | Botterweck ................. 704/255 |
| 2006/0173683 | A1 | * | 8/2006 | Roth et al. .................. 704/251 |
| 2007/0174055 | A1 | * | 7/2007 | Chengalvarayan et al. .. 704/251 |

* cited by examiner

*Primary Examiner*—Daniel D Abebe
(74) *Attorney, Agent, or Firm*—Quintero Law Office

(57) ABSTRACT

An improved voice recognition system in which a Voice Keyword Table is generated and downloaded from a set-up device to a voice recognition device. The VKT includes visual form data, spoken form data, phonetic format data, and an entry corresponding to a keyword, and TTS-generated voice prompts and voice models corresponding to the phonetic format data. A voice recognition system on the voice recognition device is updated by the set-up device. Furthermore, voice models in the voice recognition device are modified by the set-up device.

19 Claims, 16 Drawing Sheets

210

| Visual Form | Spoken Form | Phonetic Format | Entry |
|---|---|---|---|
| Home | Home | hom | 310-555-5555 |
| Set-up menu | Set-up menu | ˋsɛt͵ʌp | Entering set-up menu |
| Brian | Brian Smith | braɪən smɪθ | 310-555-5556 |
| Ryan | Ryan | raɪən | 310-555-5557 |
| Jose | Hosay | hoˋzei | 310-555-5558 |

| Visual Form | Spoken Form | Phonetic Format | Entry |
|---|---|---|---|
| Home | Home | hom | 310-555-5555 |
| Set-up menu | Set-up menu | ˈsɛtˌʌp | Entering set-up menu |
| Brian | Brian Smith | braɪən smɪθ | 310-555-5556 |
| Ryan | Ryan | raɪən | 310-555-5557 |
| Jose | Hosay | hoˈzei | 310-555-5558 |

| Visual Form | Spoken Form | Phonetic Format | Entry |
|---|---|---|---|
| Home | Home | hom | 310-555-5555 |
| Set-up menu | Set-up menu | ˈsɛtˌʌp | Entering set-up menu |
| Brian | Brian Smith | braɪən smɪθ | 310-555-5556 |
| Ryan | Ryan | raɪən | 310-555-5557 |
| Jose | Hosay | hoˋzei | 310-555-5558 |

211

213     TTS generated voice prompt     212     Voice Model

METHOD, SYSTEM AND APPARATUS FOR IMPROVED VOICE RECOGNITION

BACKGROUND OF THE INVENTION

The present invention relates to voice recognition, and more specifically to improving the performance of a voice recognition apparatus.

A Voice Keypad (VKP) is a device with the ability to recognize keywords uttered by a user and generate corresponding outputs, for example, commands or text-strings, for use by an application device.

One implementation of a VKP is a Bluetooth speakerphone for use with a mobile telephone provided with Bluetooth functionality. In such a device, the VKP speakerphone and mobile telephone are paired. A voice recognition engine on the VKP is implemented to recognize a name uttered by a user with reference to a user-defined name list and output a corresponding telephone number. A dialing function on the mobile telephone then dials the number, and the user is able carry on a conversation through the mobile telephone via the speakerphone.

There are three general classes of voice recognition, namely speaker independent (SI), speaker dependent (SD) and speaker adapted (SA). In the SI system, a voice recognition engine identifies utterances according to universal voice models generated from samples obtained from a large training population. As no individual training by the user is required, such systems are convenient. However, these systems generally have low recognition performance, especially when used by speakers with heavy accents or whose speech patterns otherwise diverge from the training population. On the other hand, SD systems require users to provide samples for every keyword, which can become burdensome and memory intensive for large lists of keywords.

Conventional SA systems achieve limited improvement of recognition performance by adapting voice models according to speech input by an individual speaker. However, it is desirable to achieve a still higher recognition rate for keywords on a VKP. Furthermore, the VKP itself may lack the appropriate resources to achieve improved voice recognition.

SUMMARY

Provided are a method, system, and apparatus for improved voice recognition.

In an embodiment of the present invention, a method for improved voice recognition in a system having a set-up device and a voice recognition device is provided. The method comprises the steps of generating a Voice Keyword Table (VKT) and downloading the VKT to the voice recognition device; upgrading a voice recognition system on the voice recognition device; and modifying a voice model in the voice recognition device.

The VKT preferably comprises visual form data, spoken form data, phonetic format data, and an entry corresponding to a keyword, and TTS-generated voice prompts and voice models corresponding to the phonetic format data. The step of generating a VKT preferably comprises the steps of inputting visual form data and entry data; transforming visual form data to default spoken form data; mapping spoken form data to phonetic format; and performing TTS-guided-pronunciation editing to modify phonetic format data. In preferred embodiments, an additional step of a confusion test using the phonetic format data, voice models and a confusion table to identify keywords in a confusion set is performed. Furthermore, additional steps may be taken to eliminate keywords from the confusion set.

In preferred embodiments, a user-initiated step of modifying a voice model in the voice recognition device comprises the steps of building a keyword model from keywords in the VKT; selecting keywords for adaptation; obtaining new speech input for selected keywords; adapting voice models for selected keywords using existing keyword voice models and new speech input to produce adapted voice models; and downloading adapted speech models to the voice recognition device.

Alternately or in addition thereto, a new-model-availability-initiated step of modifying a voice model in the voice recognition device comprises the steps of downloading a new voice model from a network to the set-up device; if the new voice model is a newer version than the voice model on the voice recognition device, determining if accumulated personal acoustic data exists; if accumulated personal acoustic data exists, uploading the VKT from the voice recognition device to the set-up device, building a keyword model for adaptation from keywords in the uploaded VKT, performing adaptation using the new voice model and accumulated personal data to produce an adapted new voice model, and downloading the adapted new voice model to the voice recognition device; and if no accumulated speech data exists, uploading the VKT to the set-up device, and building a keyword model for keywords in the uploaded VKT using the new voice model, and downloading the updated new voice model to the voice recognition device. The accumulated personal acoustic data may be, for example, speech input recorded during user-initiated adaptation of voice models and stored on the set-up device or speech input recorded during use of the voice recognition device to identify keywords and stored on the voice recognition device.

In preferred embodiments, the step of upgrading and downloading a voice recognition system to the voice recognition device comprises the steps of downloading an updated voice recognition system to the set-up device via a network; determining if the updated voice recognition system is more recent than a voice recognition system on the voice recognition device; and if the updated voice recognition system is more recent, downloading the updated voice recognition system from the voice recognition device to the set-up device.

In preferred embodiments, run-time information is saved in the voice recognition device; saved run-time information is up-loaded from the voice recognition device to the set-up device; the up-loaded run-time information is processed on the set-up device; and the voice recognition device is updated according to the results of the processing of run-time information on the set-up device to improve voice recognition performance.

In addition, the method preferably includes one or more of the steps of initiating a diagnostic test on the voice recognition device by the set-up device, providing customer support over a network, and providing wireless capable device compatibility support comprising instructions for pairing the voice recognition device with a wireless capable application device.

In an embodiment of the present invention, a voice recognition system installed on a set-up device for improving voice recognition on a voice recognition device is provided. The voice recognition system comprises a Voice Keyword Table (VKT) generating means for generating a VKT and downloading the VKT to the voice recognition device; and means for updating voice models on the voice recognition device. The VKT preferably comprises visual form data, spoken form data, phonetic format data, and an entry corresponding to a keyword, and TTS-generated voice prompts and voice models corresponding to the phonetic format data.

In preferred embodiments, the voice recognition system further comprises means for performing a confusion test using the phonetic format data, voice models and a confusion table to identify keywords in a confusion set, and eliminating keywords from the confusion set. In addition, the voice recognition system further preferably comprises means for updating the voice recognition device according to the results of the processing of run-time information saved on the voice recognition device to improve voice recognition performance.

In preferred embodiments, the voice recognition system further comprises means for user-initiated and/or new-model-availability-initiated adaptation of voice models on the voice recognition device. The means for new-model-availability-initiated adaptation preferably uses accumulated personal acoustic data recorded during user-initiated adaptation of voice models on the voice recognition device or recorded during operation of the voice recognition device to identify keywords.

In preferred embodiments, the voice recognition system further comprises one or more means for upgrading and downloading a voice recognition system to the voice recognition device, means for initiating a diagnostic test on the voice recognition device, means for providing customer support via a network, and means for providing wireless capable device compatibility support comprising instructions for pairing the voice recognition device with a wireless capable application device.

In an embodiment of the present invention, an apparatus for improved voice recognition is provided. The apparatus comprises a set-up device comprising a first Voice Keyword Table (VKT) and a first voice recognition system; and a voice recognition device comprising a second VKT corresponding to the first VKT and a second voice recognition system, the voice recognition device connectible to the set-up device through an interface. The VKT comprises visual form data, spoken form data, phonetic format data, and an entry corresponding to a keyword, and TTS-generated voice prompts and voice models corresponding to the phonetic format data. The voice recognition device is preferably a Voice Key Pad (VKP) device or a wireless earset. The set-up device is preferably a personal computer (PC).

BRIEF DESCRIPTION OF THE DRAWINGS

The present invention will now be described, by way of example, with reference to the accompanying drawings, in which.

DESCRIPTION

Figure 1:
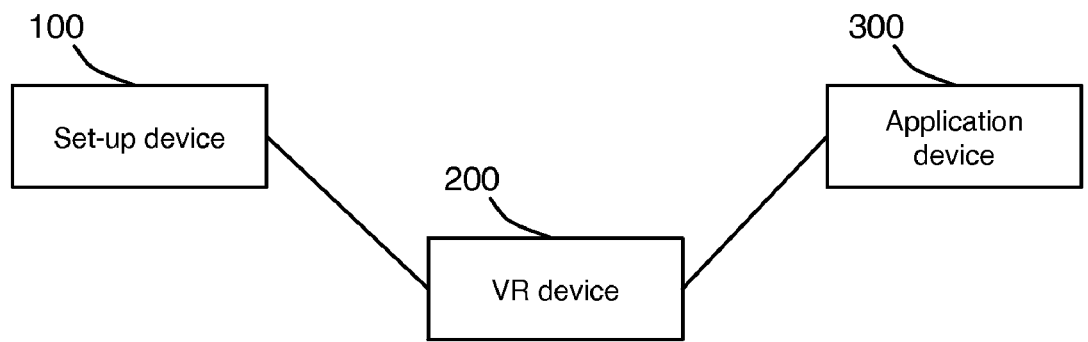
FIG. 1 is a block diagram of a voice recognition (VR) apparatus according to an embodiment of the present invention.

FIG. 1 is a block diagram of a voice recognition (VR) apparatus according to an embodiment of the present invention.

In a preferred embodiment of the invention, the VR apparatus comprises a set-up device 100, a voice recognition (VR) device 200, and an application device 300. The set-up device may be, for example, a personal computer or personal digital assistant (PDA).

The VR device 200 may be, for example, a headset, a speakerphone, an earset or an earset/speakerphone combo with VR functionality. In preferred embodiments, VR device 200 is a Voice Keypad (VKP), namely a device with the ability to recognize keywords uttered by a user and generate corresponding outputs, for example, commands or text-strings, for use by an application device.

The application device 300 is a device that performs a function under the control of the VR device 200. The application device 300 may be, for example, a mobile telephone, a PDA, a global positioning device, a home appliance or information appliance, a personal computer, a control system for a DVD/MP3 player, a car radio, or a car function controller.

Set-up device 100, VR device 200 and application device 300 are connected by wired or wireless connections. In a preferred embodiment, set-up device 100 is connected to VR device 200 by a USB interface, while VR device 200 is connected to application device 300 by a wireless interface, for example, Bluetooth.

In the embodiment described below, the set-up device 100 is a personal computer, the VR device 200 is a wireless earset, and the application device 300 is a mobile telephone. However, it is understood that this embodiment is exemplary in nature and in no way intended to limit the scope of the invention to this particular configuration.

In this embodiment, VR device 200 may be used as a VKT for dialing numbers and entering commands on the application device 300. In conjunction therewith, VR device 200 provides conventional wireless earset functionality, namely, audio input/output for conversation and other communication via the mobile telephone. It is understood that when connected to set-up device 100, VR device 200 may also serve as an audio input/out device for the set-up device.

In the case where application device 300 is simply a control system, for example, a control system for a DVD/MP3 player, VR device 200 may be used to transmit commands thereto, and no audio input/output functionality via the application device 300 need be provided.

Figure 2A:
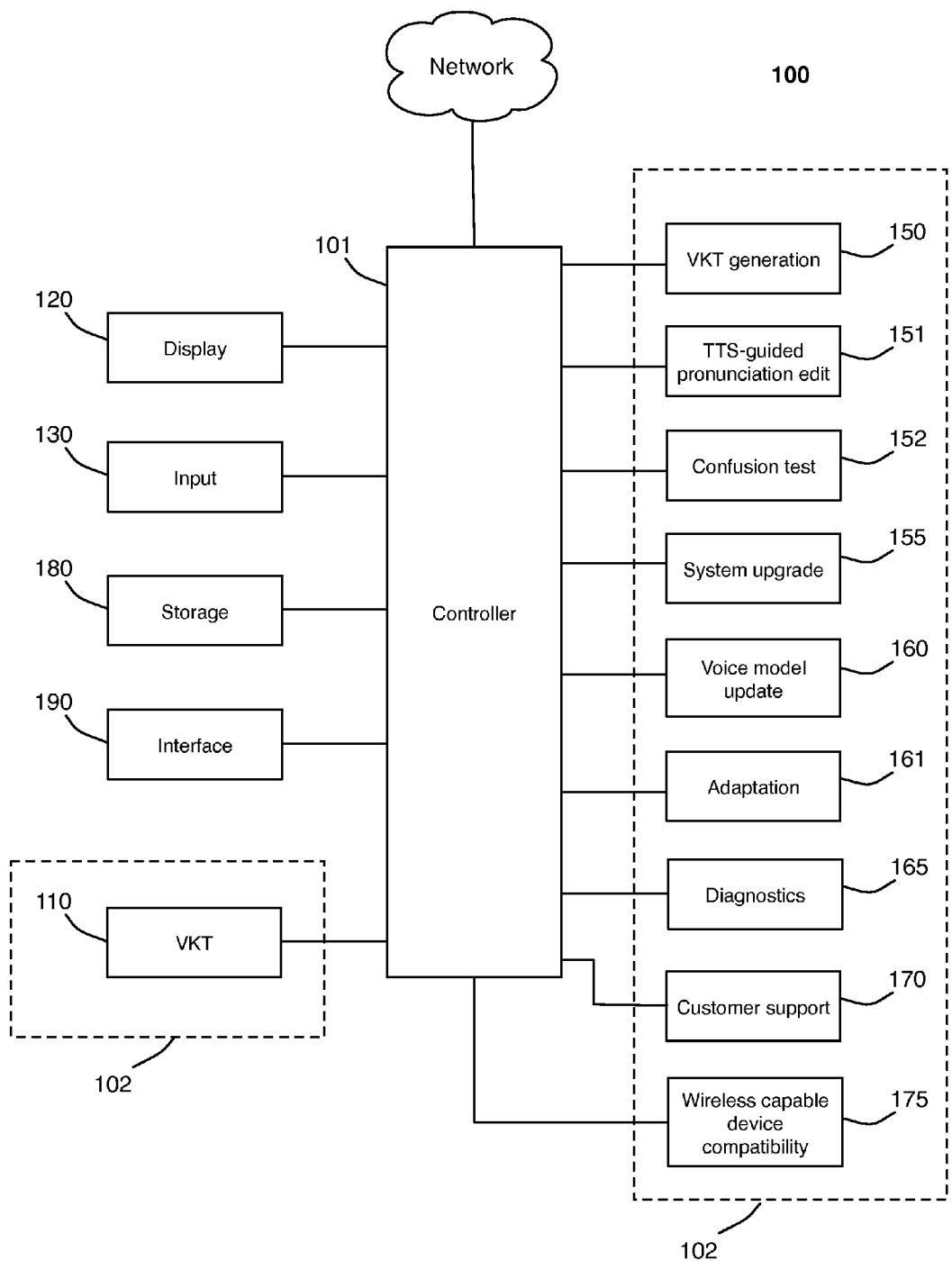
FIG. 2A is a block diagram of a set-up device according to an embodiment of the present invention.

FIG. 2A is a block diagram of a set-up device 100 according to an embodiment of the present invention.

In a preferred embodiment of the present invention, set-up device 100 is a personal computer comprising controller 101, voice recognition system (VRS) 102, display 120, input 130, storage 180, and interface 190.

The controller 101 may be, for example, a microprocessor and related hardware and software for operating the set-up device 100. Display 120 may be, for example, a monitor such as a LCD monitor. Input device 130 may be a keyboard/mouse or other conventional input device or devices. Storage 180 is a memory or memories, for example, a hard drive or flash memory, and is used for storing new voice models and personal accumulated acoustic data, as will be described in further detail below. An interface 190 for connecting to VR device 200 is also provided, for example, a USB interface, a wireless interface such as Bluetooth, or an 802.11 wireless network interface. Furthermore, set-up device 100 is connected to a network, for example, a global network such as the World Wide Web.

In a preferred embodiment, VRS 102 comprises a Voice Keyword Table (VKT) 110 and a number of modules implemented in software and/or hardware on set-up device 100. As will be described in further detail in connection with FIGS. 5-10, the modules preferably include Voice Keyword Table (VKT) generation module 150 including a TTS-guided-pronunciation editing module 151 and a confusion test module 152, system upgrade module 155, voice model update module 160 including an adaptation module 161, diagnostics module 165, customer support module 170, and wireless capable device compatibility module 175. In a preferred embodiment, the VKT and, to the extent that they are software, the modules, are stored in a memory or memories of set-up device 100.

Figure 2B:
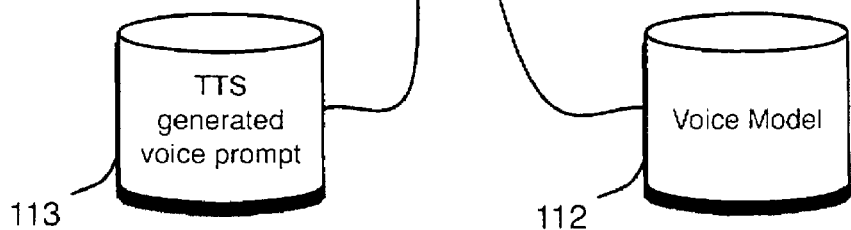
FIG. 2B is a block diagram of a Voice Keyword Table (VKT) on the set-up device according to an embodiment of the present invention.

FIG. 2B is a block diagram of VKT 110 according to an embodiment of the present invention.

In a preferred embodiment of the invention, VKT 110 comprises table 111, voice model database 112, and TTS-generated voice prompt database 113. Table 111 stores pre-defined keywords, such as HOME and SET-UP MENU, and user-defined keywords such as BRIAN, RYAN and JOSE, and entry data corresponding to the keywords. Entry data may be text-strings, such as telephone numbers, or commands, such as a command for entering a set-up menu.

As will be described in further detail below, in preferred embodiments, table 111 stores visual form data corresponding to any visual symbol the user uses to represent a keyword in the VKT 110, and spoken form data corresponding to an utterance associated with the keyword. In addition, table 111 comprises phonetic format data corresponding to the spoken form data.

It is understood that depending on the application device used in conjunction with the VR device, keywords of different categorizations may be employed. Namely, pre-defined and user-defined keywords may include command functions related to the features of any particular application device. For example, if the application device is a MP3 player, the keywords may include pre-defined MP3 player commands such as STOP or RANDOM, user-defined commands, and others. The commands may also be associated with operation of the VR device itself. For example, the command SET-UP MENU may activate a voice prompt interface on the VR device.

Furthermore, the entry data is not limited to text-strings and commands. For example, entry data may include images, wave files, and other file formats. It is further contemplated that more than one entry field be associated with a given keyword. It is also contemplated that the VKT may store speaker dependent voice tags and corresponding speaker dependent voice models and entry data.

Voice model database 112 stores the current set of voice models for the system. In embodiments of the invention, a voice model generating module of VRS 102 generates voice models corresponding to the phonetic format data for keywords in VKT 110 to populate voice model database 112. As will be explained in further detail below, the voice models may comprise universal speaker-independent (SI) voice models and/or speaker-adapted (SA) voice models adapted according to embodiments of the present invention.

TTS-generated voice prompt database 113 stores data for the generation of text-to-speech (TTS) voice prompts used in embodiments of the present of invention. In embodiments of the invention, a TTS-module of VRS 102 generates speech wave files corresponding to the phonetic format data for keywords in VKT 110 to populate voice prompt database 113.

Additional features of VKT 110 are described in following sections in connection with FIGS. 5-10.

Figure 3A:
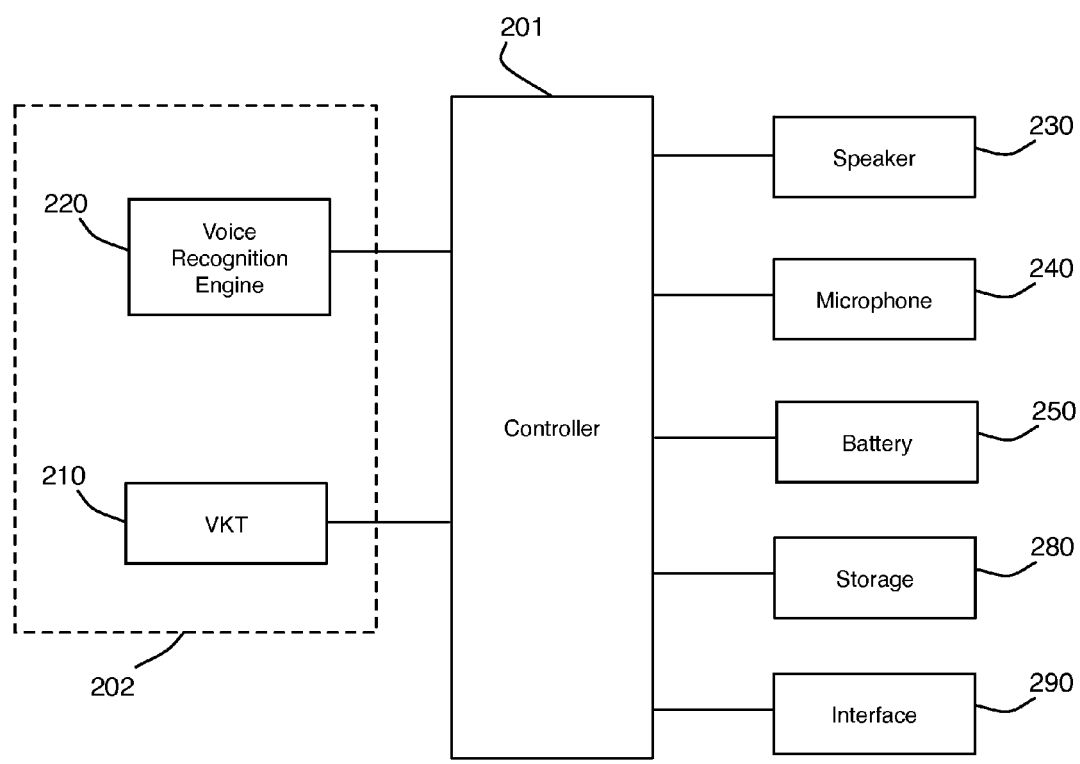
FIG. 3A is a block diagram of a VR device according to an embodiment of the present invention.

FIG. 3A is a block diagram of VR device 200 according to an embodiment of the present invention.

In a preferred embodiment of the present invention, VR device 200 comprises controller 201, voice recognition system (VRS) 202 comprising VKT 210 and voice recognition engine (VRE) 220, speaker 230, microphone 240, battery 250, storage 280, and interface 290.

The controller 201 may be, for example, a microprocessor and related hardware and software for operating the VR device 200 and performing digital signal processing on audio input received by microphone 240. Speaker 230 is a conventional speaker for outputting audio. Microphone 240 may be a single microphone or an array microphone, and is preferably a small array microphone (SAM). Storage 280 is a memory or memories, preferably a flash memory, and is used for storing run-time information and/or personal accumulated acoustic data, as will be described in further detail below. Interface 290 is provided for connecting with set-up device 100 and application device 300. For example, a USB interface may be provided for connecting to set-up device 100, while a wireless interface may be provided for connecting to application device 300. In the case where VR device 200 connects to both devices by a wireless connection, the interface may comprise a single wireless interface (for example, Bluetooth) or multiple wireless interfaces (for example one Bluetooth and one 802.11 wireless network).

Figure 3B:
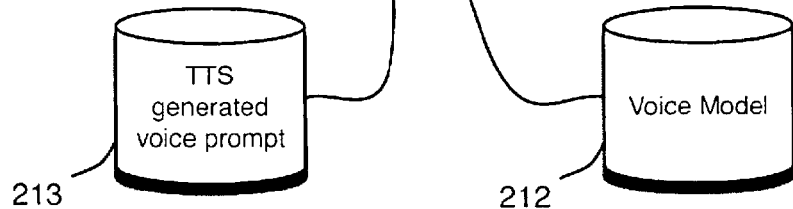
FIG. 3B is a block diagram of a corresponding VKT on the VR device according to an embodiment of the present invention.

VKT 210 corresponds to VKT 110, and, as shown in FIG. 3B, comprises corresponding table 211, voice model database 212, and TTS-generated voice prompt database 213.

In preferred embodiments, VRE 220 receives signals generated by microphone 240 and processed by controller 201, extracts feature data for comparison with voice models stored in voice model database 212 so as to determine if the utterance matches a keyword in VKT 210. As the features and operation of voice recognition engines are well known in the art, further description is not provided here.

It is a feature of embodiments of this invention that VKT 110 is mirrored in VKT 210. Namely, data entered into VKT 110 may be synched to VKT 210, and vice versa, when the corresponding devices are connected.

In embodiments of the present invention, VR device 200 includes functionality to receive data input independent from set-up device 100. For example, VR device 200 may include a voice prompt guided interface for adding data to VKT 210. In this case, newly adding data in VKT 210 may be synched to VKT 110 when the corresponding devices are connected.

It is a feature of the preferred embodiment of the present invention that run-time information collected in the operation of VR device 200 is stored in storage 280. When VR device 200 is connected to set-up device 100, the run-time information is uploaded from VR device 200 to the set-up device 100 and processed by VRS 102 for the purpose of improving voice recognition performance. The VR device 200 may then be updated according to the results of the processing of run-time information and improved voice recognition performance. An example of the kind of run-time information that may be stored is acoustic data corresponding to successful keyword recognitions and/or data obtained from application device 300.

Figure 4:
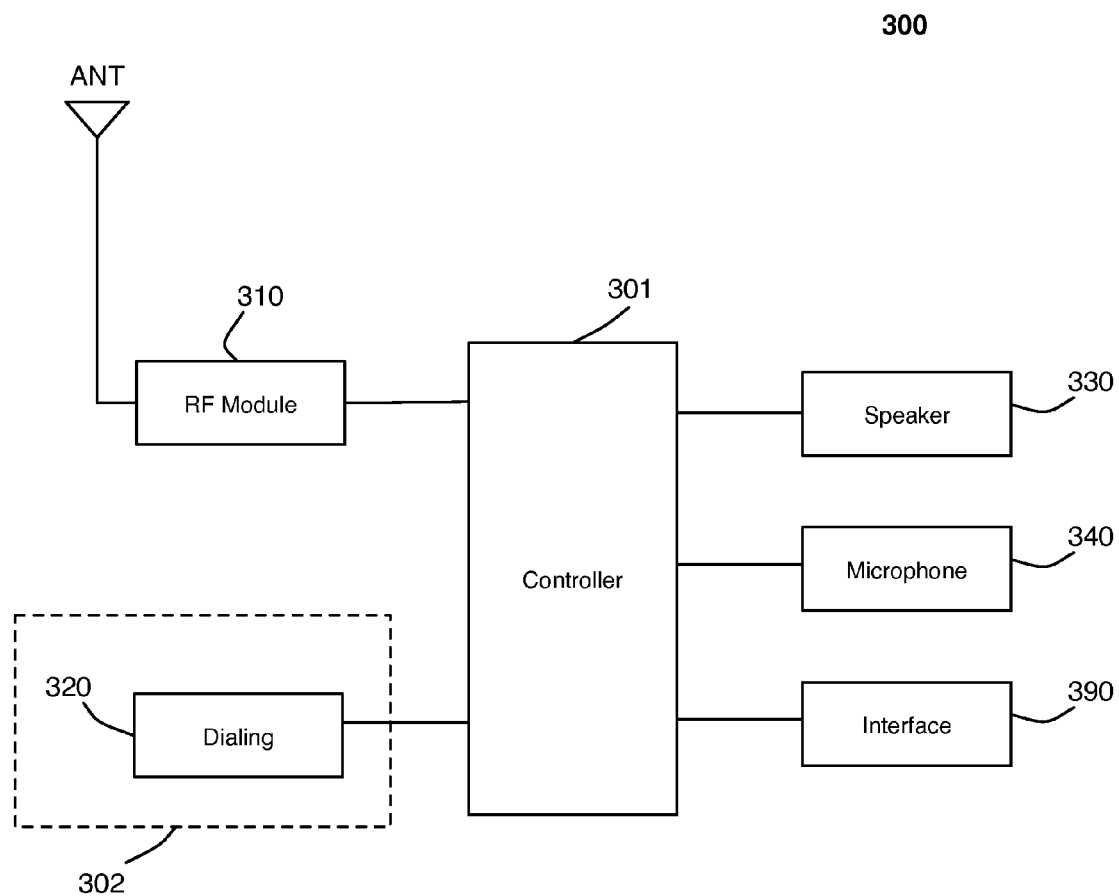
FIG. 4 is a block diagram of an application device according to an embodiment of the present invention.

FIG. 4 is a block diagram of application device 300 according to an embodiment of the present invention.

In a preferred embodiment of the present invention in which application device 300 is a mobile telephone, application device 300 comprises a controller 301, an RF module 310 with an antenna for connecting to a communications network, a control program 302 comprising a dialing module 320 stored in a memory, a speaker 330 and a microphone 340. An interface 390 is provided for connecting to SR device 200, for example, a wireless interface such as Bluetooth. As the features and structure of a mobile telephone are well known in the art, further description is not provided here.

In general, a user operates VR device 200 to control application device 300. In the embodiment where application device 300 is a mobile telephone, for example, if a user wishes to dial a contact RYAN, he or she utters the keyword RYAN into microphone 240. After front-end digital signal processing, VRS 202 determines a matching keyword, if any. If there is a keyword match, entry data corresponding to the matched keyword is transmitted from VR device 200 to application device 300 via interfaces 290 and 390. If, for example, the entry data corresponding to RYAN is a telephone number, a dialing module receives the telephone number and dials the contact RYAN. It is understood that the system may also include other conventional functions such as a voice prompt feedback step allowing the user to confirm or reject a keyword match.

It is another feature of preferred embodiments of the present invention that during normal use of the VR device 200, personal acoustic data is recorded and accumulated in storage 280 for later use in adaptation. For example, if the user utters the keyword RYAN and the user confirms the match determined by VRS 202, the recorded utterance is stored in storage 280 along with data associating the recorded utterance with the keyword RYAN. It is further understood that other methodologies may be employed to determine if VRS 202 successfully matched the keyword.

Furthermore, the user may operate VR device 200 to control the VR device itself. For example, if the user utters SET-UP menu, controller 201 may cause the VR device to output a voice guided set-up menu via speaker 230.

The operation of the voice recognition apparatus and component parts thereof is described in further detail below.

Figure 5:
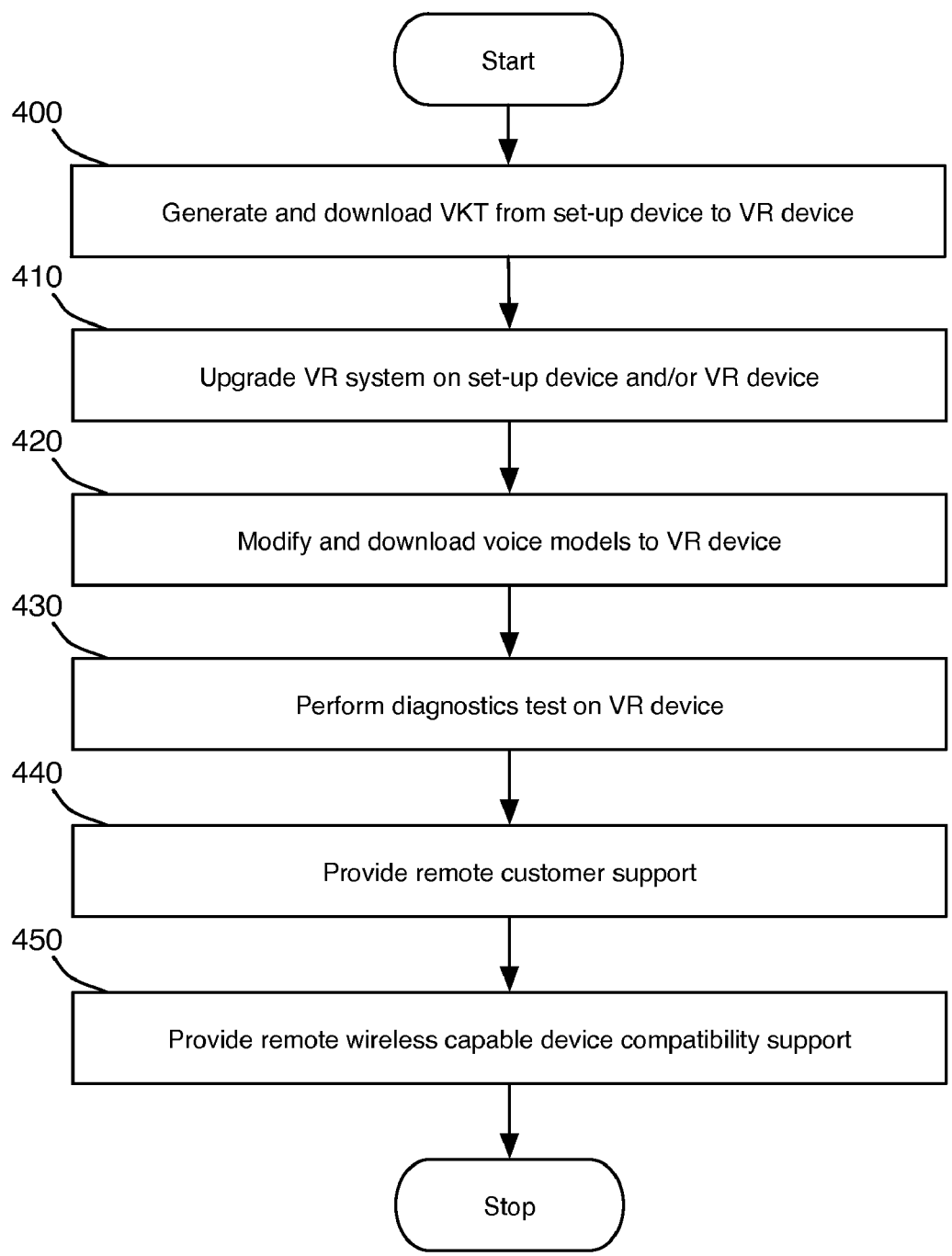
FIG. 5 is a flow diagram of a method of improved voice recognition according to an embodiment of the present invention.

FIG. 5 shows the basic process flow of a preferred embodiment of VRS 102 for achieving improved voice recognition of the present invention. Steps 400-430 are described in further detail in connection with FIGS. 6-10.

In step 400, VKT 110 is generated on the set-up device 100 and downloaded to the VR device 200, where it is stored in a memory as VKT 210.

In step 410, one or both of VRS 102 and VRS 202 are upgraded.

In step 420, voice models are modified and downloaded from set-up device 100 to VR device 200.

In step 430, a diagnostics routine is performed on VR device 200.

In step 440, remote customer support is provided. In a preferred embodiment, an interface may be provided via display 120 and input 130 allowing a user to link to a knowledgebase or other customer support services. In addition, manual download of updated software and voice models may be performed through this interface.

In step 450, remote wireless capable device compatibility support is provided. In a preferred embodiment, an interface is provided on display 120 for the user to link to a wireless capable device compatibility database over a network using input device 130. In a preferred embodiment, the network comprises a web server. For example, in an embodiment of the present invention in which application device 300 is a mobile telephone with Bluetooth functionality, the database contains specific instructions for pairing VR device 200 with various makes and models of mobile telephones.

It is understood that the present invention is not intended to be limited to the performance of all of steps 400-450, or performance of the steps in the above-described order, although in a most preferred embodiment each of steps 400-450 is performed.

Figure 6A:
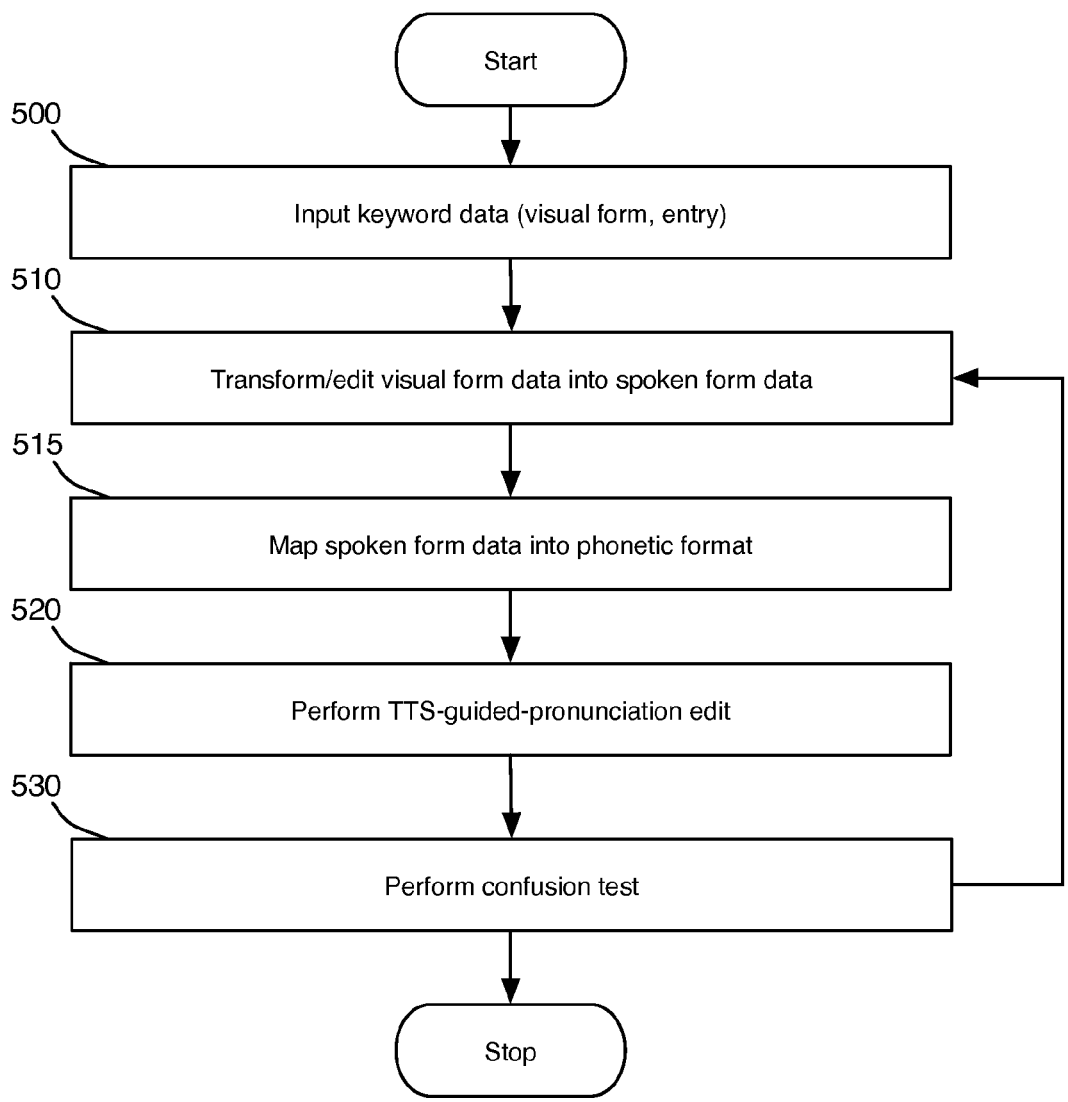
FIG. 6A is a flow diagram of a method of generating a VKT according to an embodiment of the present invention.
Figure 6B:
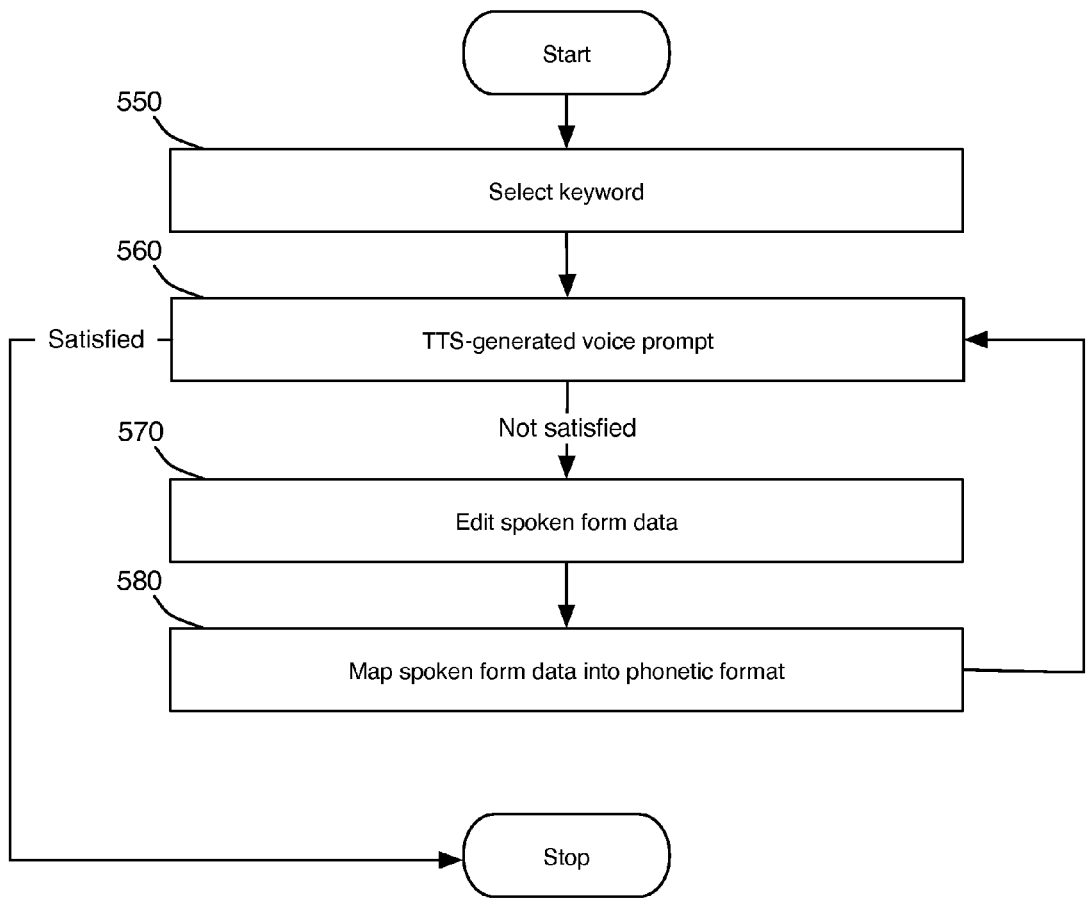
FIG. 6B is a flow diagram of a method of performing TTS-guided-pronunciation editing according to an embodiment of the present invention.

FIG. 6A shows the steps of generating a VKT according to a preferred embodiment of the present invention.

In step 500, keyword data is inputted into visual form and corresponding entry fields of table 111. For example, in a preferred embodiment, data may be extracted from a software application by VKT generation module 150 to populate the visual form and entry data fields of table 111. Manual input, or editing of extracted data may also be performed to input data into table 111.

In a preferred embodiment of the present invention, visual form, spoken form, and entry data is displayable on display 120 and may be entered/edited in table 111 with input device 130.

For example, in an embodiment of the present invention where application device 300 is a mobile telephone and set-up device 100 is a personal computer, the user may elect to extract data from an online telephone program account or an email address book located on set-up device 100 or accessed by set-up device 100 via a network to populate the visual form and entry data fields of table 111. In this case, VKT generation module 150 extracts relevant data and populates table 111. The table may then be edited by amending, adding, or deleting keywords and entries (for example, names and telephone numbers) according to the user's preference.

In step 510, visual form data is transformed into spoken form data. Visual form data corresponds to any visual symbol the user uses to represent a keyword in the VKT. On the other hand, spoken form data corresponds to an actual utterance associated with the keyword. In a preferred embodiment, default spoken form data is automatically generated from visual form data by VKT generation module 150. If the keywords are in a language in which the visual form data can also serve as the basis for word-to-phoneme translation and is easily edited by a user to achieve different pronunciations, the visual form data may simply be copied into the spoken form data. For example, if the keyword is RYAN, the visual form data and the default spoken form data are the same. On the other hand, for a language such as Chinese, in which the visual form data cannot serve as the basis for word-to-phoneme translation and is not easily edited to achieve different pronunciations, a word-to-pinyin translation or the like may be employed to generate the default spoken form data in pinyin or other alphabet conversion format. Thus, if the keyword is the Chinese word for "flower" and word-to-pinyin translation were employed, the visual form data would be the Chinese character for flower (花)and the default spoken form data would be the pinyin translation thereof, i.e., "HUA".

The user may also add or edit spoken form data by manual entry through input device 130. For example, in table 111, the default spoken form data for keywords BRIAN and JOSE is BRIAN and JOSE, but for reasons explained in further detail in the following, the spoken form data has been edited to BRIAN SMITH and HOSAY.

In step 515, spoken form data is mapped to phonetic format data by VKT generation module 150 by a word-to-phoneme translation module utilizing a pronunciation dictionary and pronunciation rules.

In step 520, TTS-guided-pronunciation editing is performed by the TTS-guided-pronunciation editing module 151. This step is shown in further detail in FIG. 6B, in which the following steps are performed.

In step 550, the user selects a keyword. Subsequently, in step 560, a TTS-generated voice prompt is generated by VKT generation module 150 according to the phonetic format data currently stored corresponding to the selected keyword and TTS-generated voice prompt database 113. If the user is satisfied with the output, the routine is ended and, at the user's option, another keyword may be selected. The voice prompt is preferably outputted by speaker 230 of VR device 200 if VR device 200 is connected to set-up device 100. Alternately, a speaker or other audio output device of set-up device 100 (not shown) may be used.

If the user is not satisfied with the output, the user may in step 570 edit the spoken form data in table 111. The edited spoken form data is in turn mapped to phonetic form a in step 580, and the routine returns to step 560 to determine if the user is satisfied with the modification, or if further editing of the spoken form data is required to bring the pronunciation generated by the TTS-generated voice prompt closer to the desired pronunciation.

For example, in the case of a keyword JOSE, the default spoken form data is JOSE. However, the mapped phonetic format data for JOSE is 'dʒoz, which sounds like JOE-SEE when the voice prompt is generated. If this pronunciation is unsatisfactory to the user, the user may edit the spoken form data to HOSAY, for which the mapped phonetic format data is ho'zei. The voice prompt generated corresponding to this phonetic format data sounds like the Spanish-language pronunciation of the word Jose.

Returning to FIG. 6A, in step 530, in a preferred embodiment of the present invention a confusion test is performed on VKT 110 by confusion test module 152 in which phonetic format data corresponding to keywords is analyzed such that keywords are recognized as members of a confusion set and distinguished. Namely, phonetic format data from table 111, corresponding voice models from voice model database 112, and a confusion table are used to generate a confusion matrix to check and predict the recognition performance for the keywords and provide guidance to the user for improving performance. For example, the spoken form data may be changed to obtain a different pronunciation, a prefix or suffix may be added to the keyword, or adaptation may be performed on the confusable words.

For example, on determination of a confusion set, the user may elect to edit spoken form data for one or more of the confused terms, thereby returning the routine to step 510. In the case where the keywords are BRIAN and RYAN, phonetic format data mapped from the default spoken form data (BRIAN and RYAN), may be identified as a confusion set based on the voice models present in voice model database 112. Once identified to the user as such, the user may elect to edit the spoken form data for BRIAN to BRIAN SMITH. New phonetic format data is then mapped from the edited spoken form data in step 515.

It is a feature of embodiments of the present invention that the same set of phonetic format data is shared between TTS-guided-pronunciation editing and voice recognition. Namely, the user edits the pronunciation of a keyword guided by TTS-guided-pronunciation editing to be close to his/her own accent. Furthermore, the phonetic format data mapped from spoken form data that is the result of the TTS-guided-pronunciation editing process is used in the generation of voice models stored in voice model databases 112/212. Thus, the voice models correspond more closely to the specific pronunciation of the user and the recognition performance of VRS 202 can be improved.

Figure 7A:
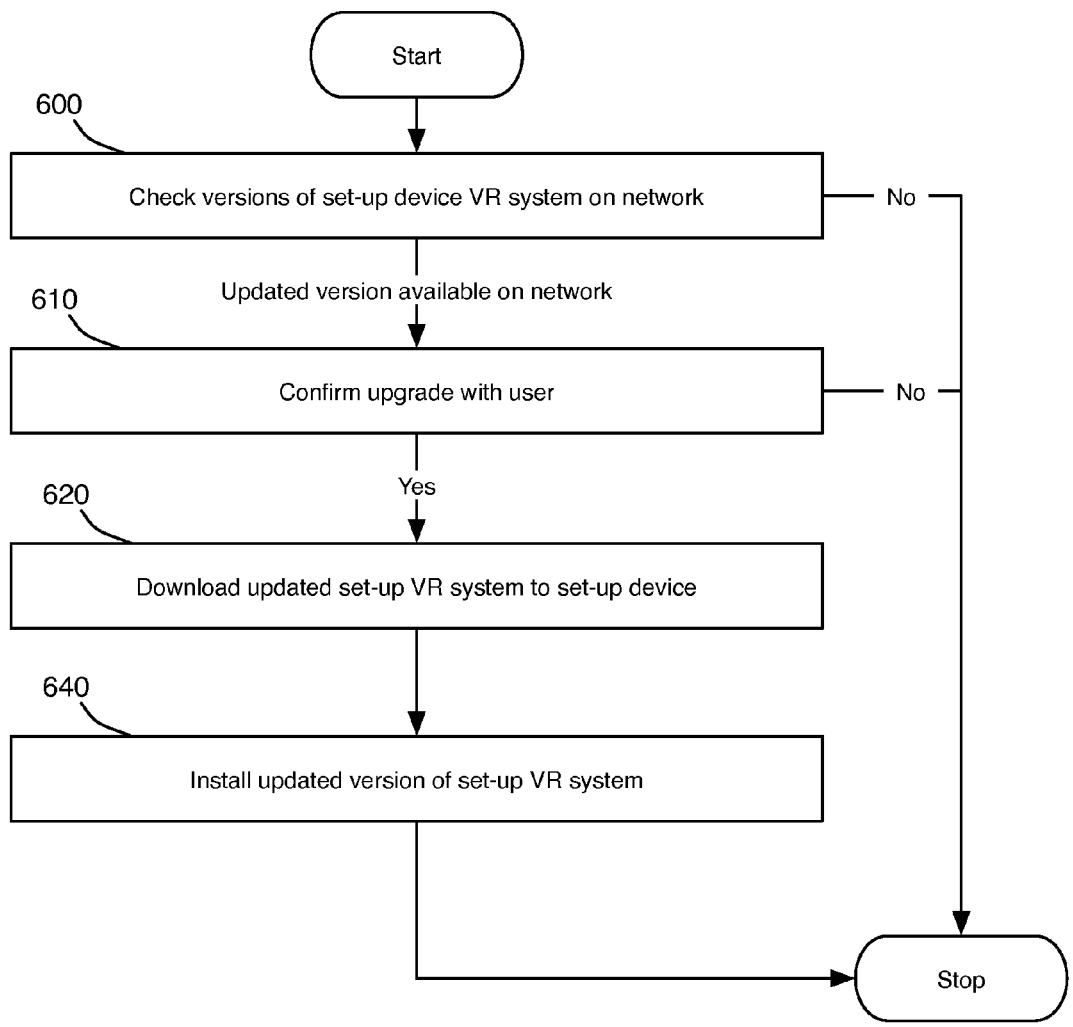
FIG. 7A is a flow diagram of a method of upgrading the set-up device VR system according to an embodiment of the present invention.

FIG. 7A is a flow diagram of a preferred method of upgrading VRS 102.

In step 600, the system upgrade module 155 accesses a remote server via a network to determine if an updated version of the VRS 102 is available.

In step 610, if an updated version of the VRS 102 is available, the user is prompted regarding the availability of the upgrade.

If the user confirms the upgrade in step 610, in step 620 the updated version of VRS 102 is downloaded to the set-up device 100 via the network and stored in storage 180.

In step 640, the updated version of VRS 102 is installed on set-up device 100.

Figure 7B:
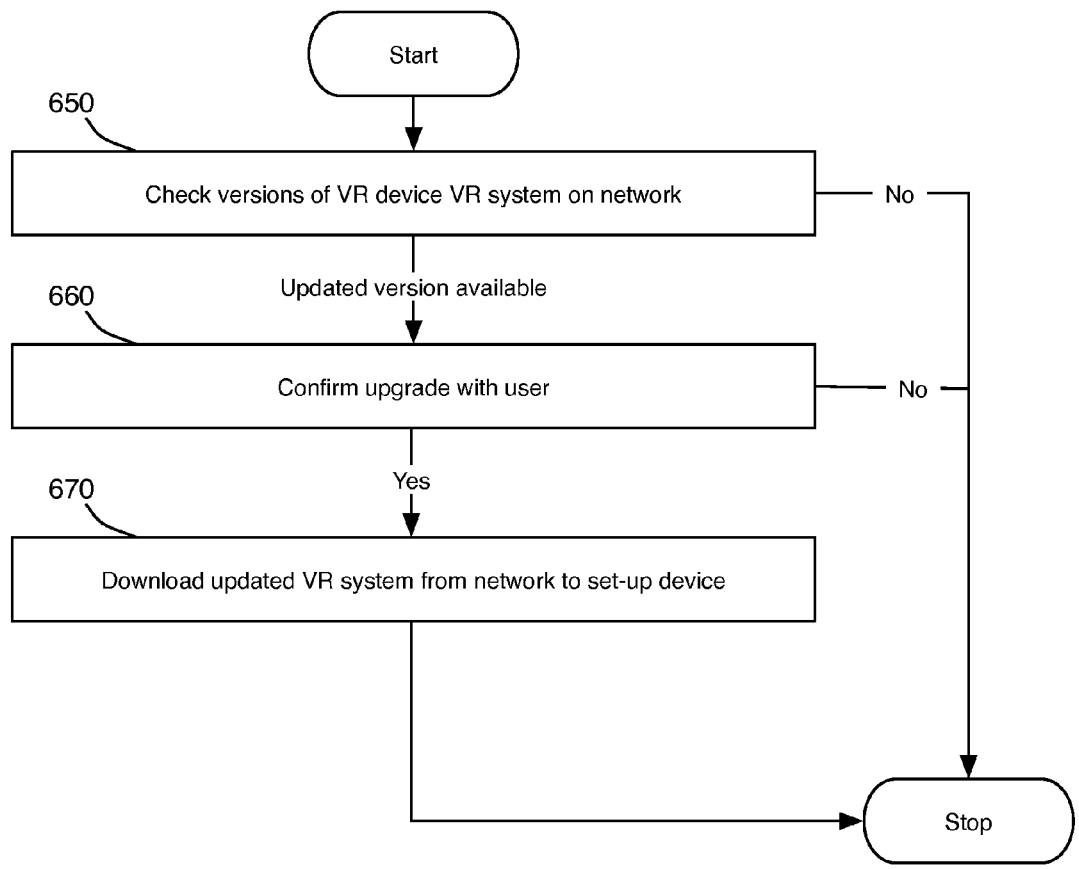
FIG. 7B is a flow diagram of downloading an updated version of the VR device system to the set-up device according to an embodiment of the present invention.
Figure 7C:
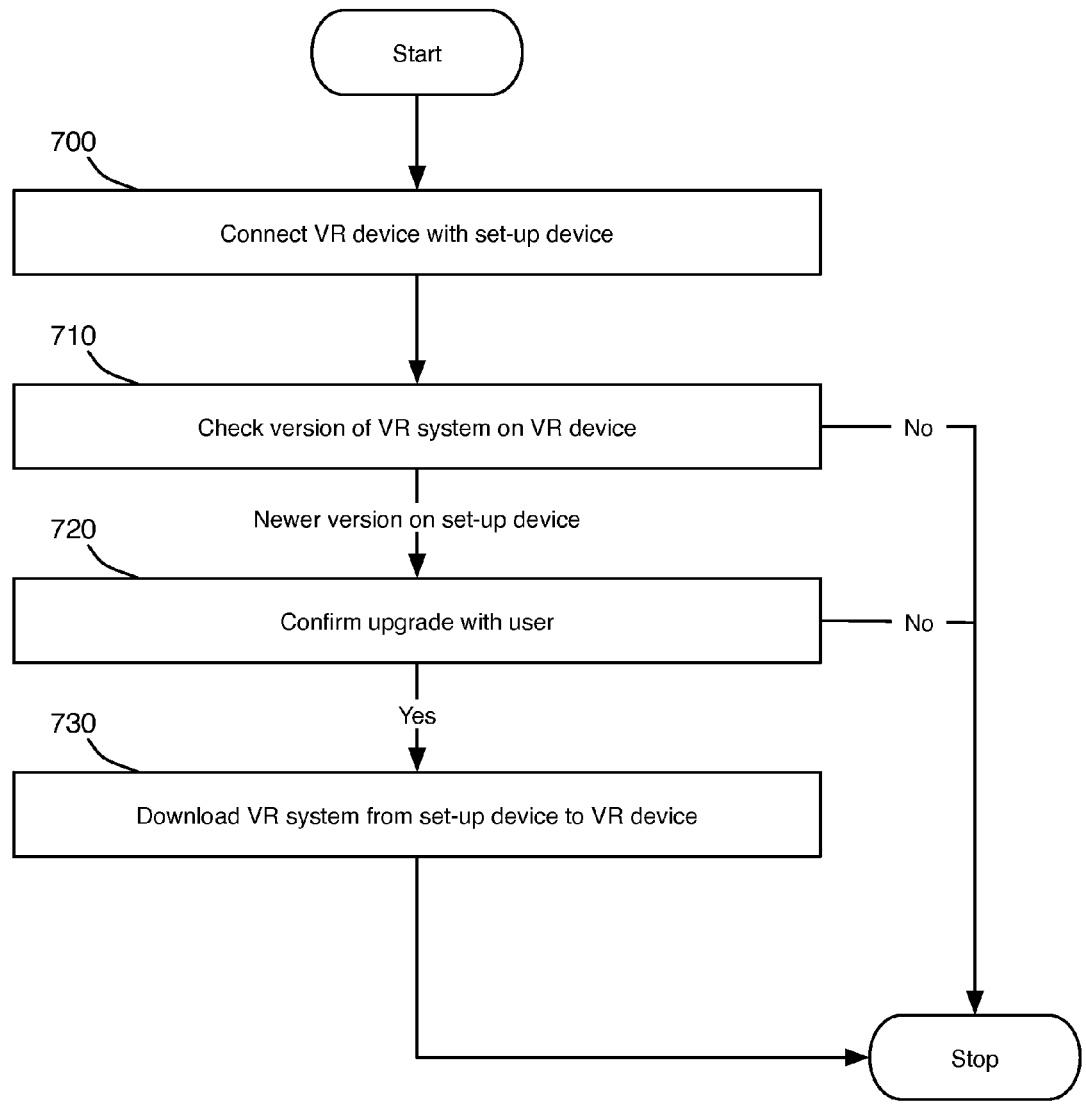
FIG. 7C is a flow diagram of a method of updating the VR system on the VR device according to an embodiment of the present invention.

FIGS. 7B and 7C show flow diagrams of a preferred method of upgrading VRS 202.

In step 650, the system upgrade module 155 accesses a remote server via a network to determine if an updated version of the VRS 202 is available.

In step 660, if an updated version of the VRS 202 is available, the user is prompted regarding the availability of the upgrade.

If the user confirms the upgrade in step 660, in step 670 the updated version of VRS 202 is downloaded to the set-up device 100 via the network and stored in storage 180.

Then, with reference to FIG. 7C, in step 700, the VR device 200 is connected with the set-up device 100.

In step 710, system upgrade module 155 checks the version of VRS 202 installed on VR device 200.

If the updated version of VRS 202 is newer than the version installed on VR device 200, the user is prompted regarding the availability of an upgrade.

If the user confirms an upgrade, in step 730, the updated version of VRS 202 is downloaded to the VR device 200 and installed.

In preferred embodiments of the present invention, voice models are modified and downloaded to VR device 200 in two different ways: user-initiated and new-model-availability-initiated.

Figure 8:
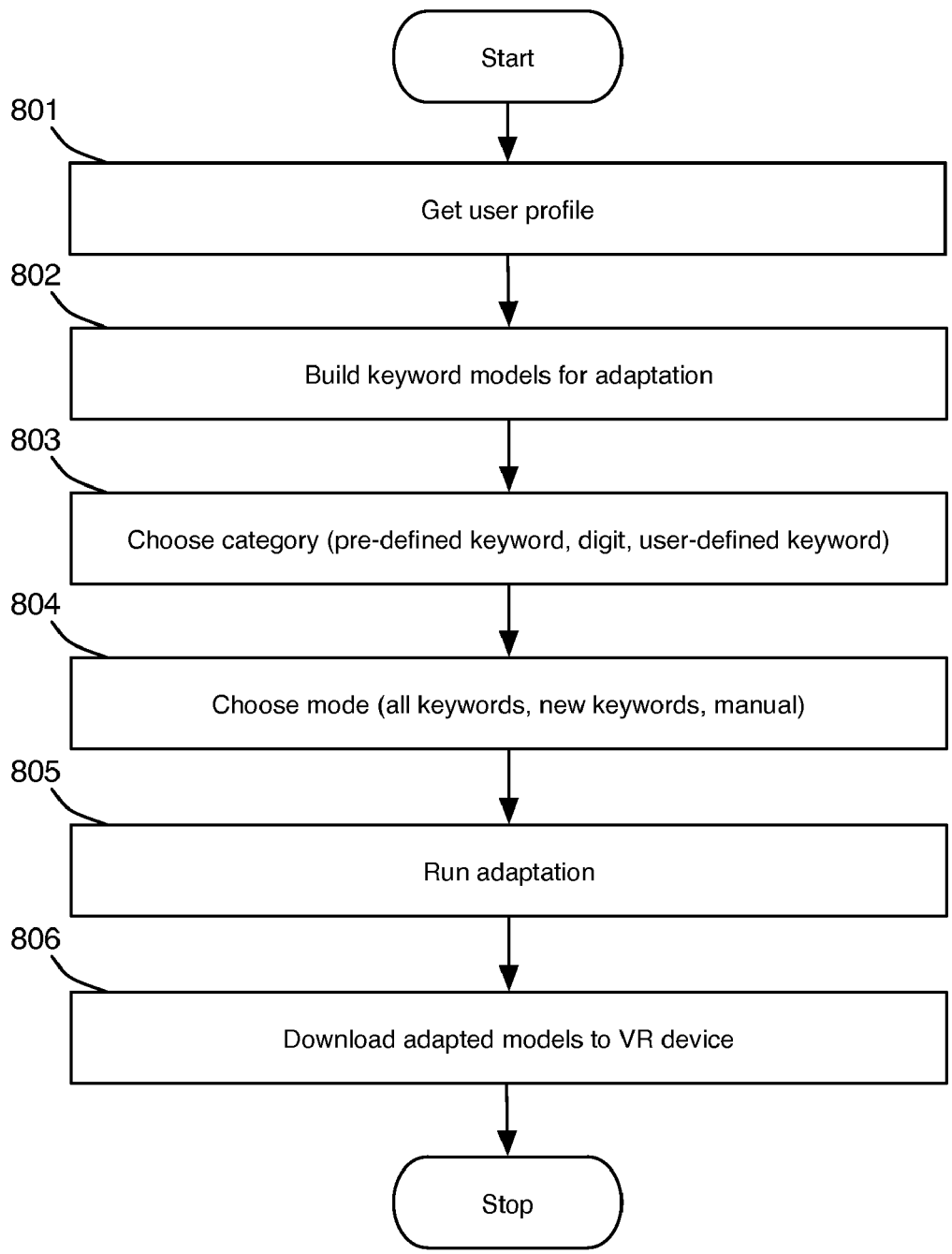
FIG. 8 is a flow diagram of a method of user-initiated voice model adaptation according to an embodiment of the present invention.

FIG. 8 is a flow diagram of a method of performing user-initiated adaptation of voice models on VR device 200 according to an embodiment of the present invention.

In step 801, the user profile is obtained by voice model update module 160.

In step 802, keyword models are built for adaptation for keywords in VKT 110. In preferred embodiments of the present invention, pre-defined keyword and digit models are built in advance, and only user-defined keywords models need to be built for adaptation in this step.

In step 803, the user is prompted to select a category for adaptation. The categories may include pre-defined keywords, digits, or user-defined keywords. As noted, pre-defined keyword are defined by the system, such as HOME corresponding to a text-string or SET-UP MENU corresponding to a command. User-defined keywords are those extracted during creation of the VKT 110 or entered by other means. Digits are the numerals 0-1-2-3-4-5-6-7-8-9.

In step 804, the user is prompted to select a mode. For example, the user may choose to adapt all keywords, new keywords, or manually select the keywords to adapt.

In step 805, an adaptation engine 161 in voice model update module 160 performs an adaptation using accumulated personal acoustic data corresponding to the user profile (if any), the currently existing voice models (for example, the original SI voice models or previously adapted voice models) stored in voice model database 112, and new speech input provided by the user to produce adapted voice models for download. In this step, the system is preferably trained with a number of utterances corresponding to keywords in the selected category as determined by the selected mode to improve the recognition performance of the system for a given user. Adaptation techniques are well known in the art and are not discussed in further detail here.

In a preferred embodiment, VR device 200 is connected to set-up device 100 and new speech input is captured via microphone 240. Otherwise, new speech input may be inputted by a microphone provided with set-up device 100 (not shown).

It is a feature of preferred embodiments of the present invention that personal acoustic data is recorded and accumulated in storage 180 in association with the user profile during user-initiated adaptation. For example, if the user provides new speech input for the keyword RYAN, the recorded utterance is stored in storage 180 along with data associating the recorded utterance with the keyword RYAN.

In step 806, adapted voice models are downloaded from set-up device 100 to VR device 200 and stored in voice model database 212.

Figure 9A:
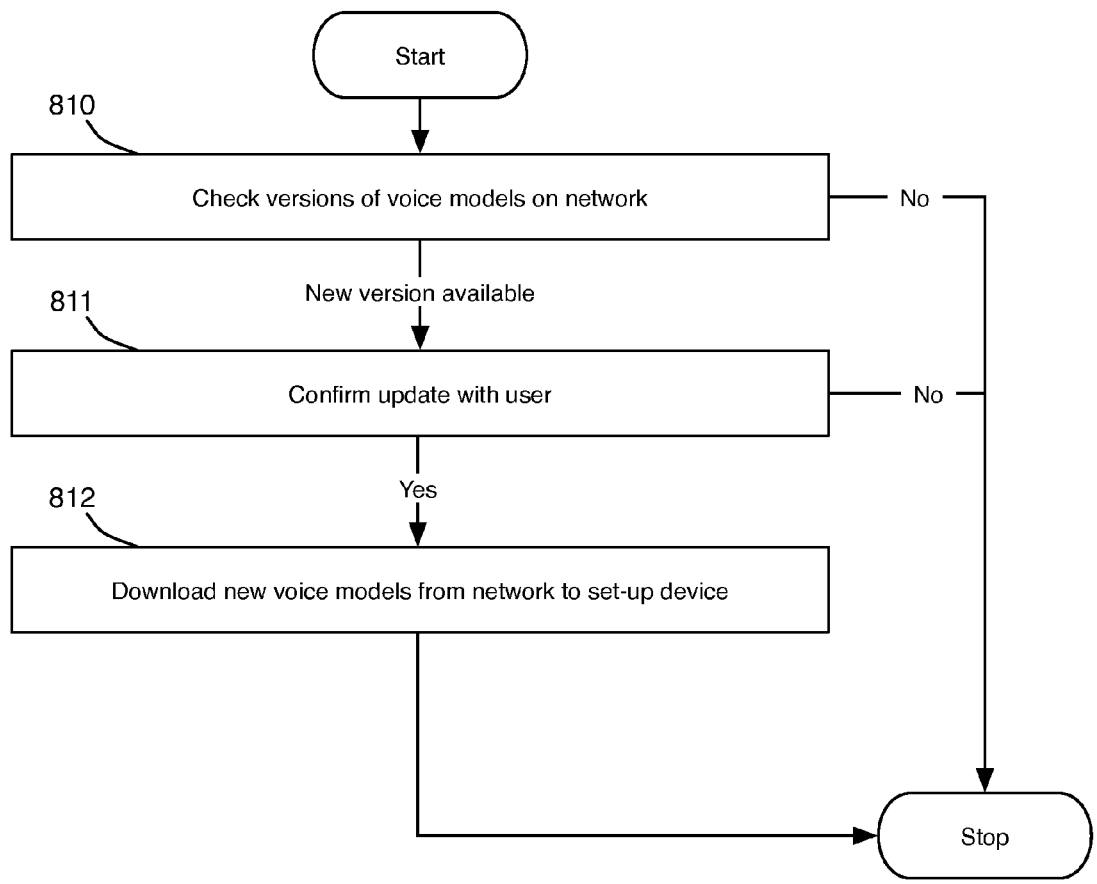
FIG. 9A is a flow diagram of a method of downloading new voice models to the set-up device according to an embodiment of the present invention.
Figure 9B:
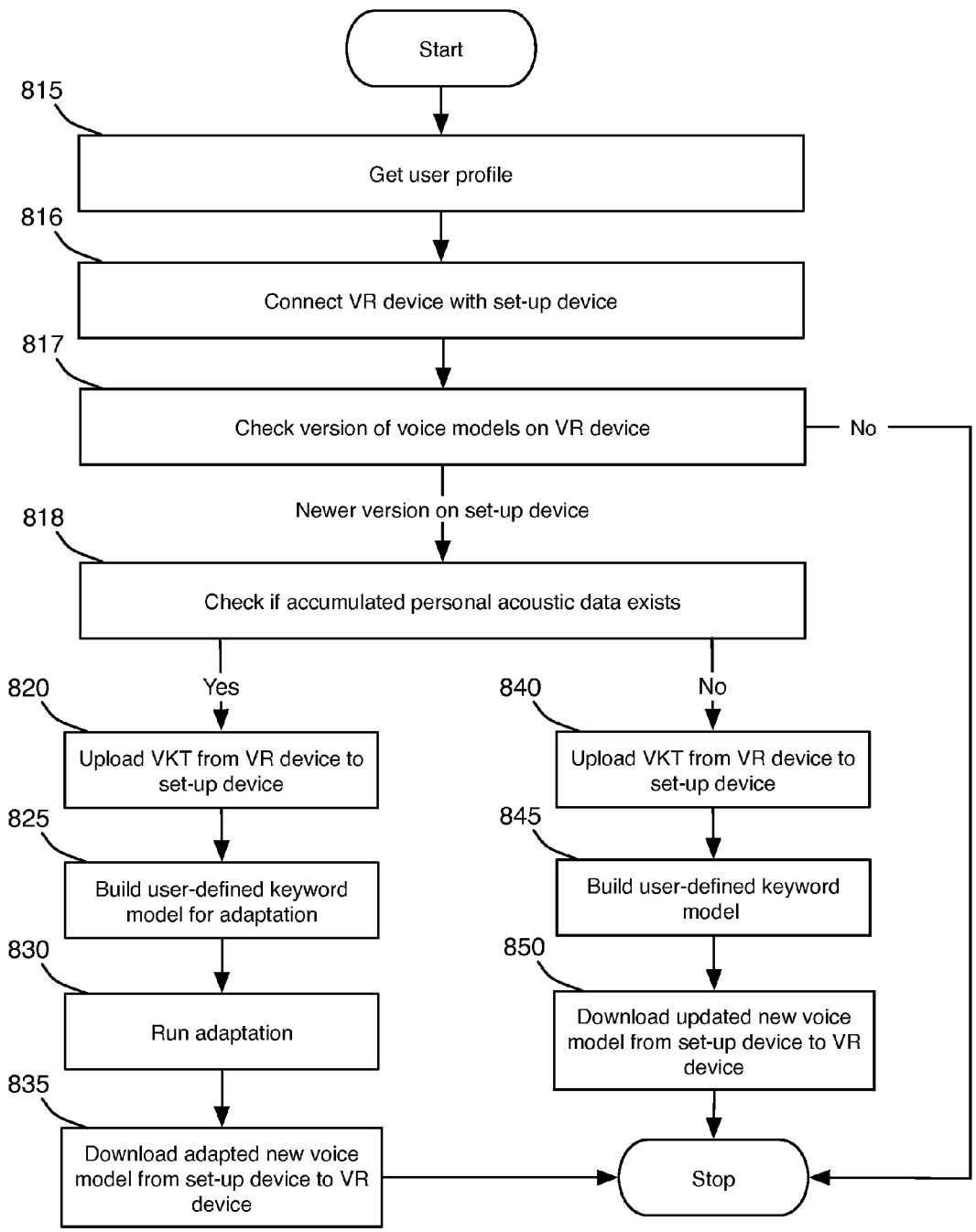
FIG. 9B is a flow diagram of a method of new-model-availability-initiated voice model adaptation according to an embodiment of the present invention.

FIGS. 9A and 9B illustrate a method of modifying voice models on VR device 200 initiated by the availability of new voice models on a network according to an embodiment of the present invention.

First, as shown in FIG. 9A, new voice models are downloaded to the set-up device.

In step 810, a remote server is accessed via a network to determine if new voice models are available. New voice models may be, for example, new SI models developed reflecting improvements in the art or directed to a specific speaker group and stored on a remote server.

In step 811, if new voice models are available, the user is prompted regarding the availability of the update.

In step 812, if the user confirms the update, the new voice models are downloaded to the set-up device 100 via the network and saved in storage 180.

FIG. 9B is a flow diagram of a method of new-model-availability-initiated voice model adaptation according to an embodiment of the present invention.

In step 815, the user profile is obtained.

In step 816, the VR device 200 is connected to set-up device 100.

In step 817, voice model update module 160 compares the versions of the voice models in voice model database 212 on the VR device 200 with the new voice models stored in storage 180 on set-up device 100. If there are newer versions available on the set-up device, the user is prompted regarding the available upgrade.

If the user confirms the upgrade, in step 818, voice model update module 160 checks to determine if accumulated personal acoustic data corresponding to the user profile is available. For example, personal acoustic data accumulated during previous user-initiated adaptation may be stored in storage 180. Furthermore, personal acoustic data accumulated during normal operation of VR device 200 and stored in storage 280 may be uploaded to storage 180 and associated with the user profile.

If so, in step 820, VKT 210 is uploaded into a memory in set-up device 100.

In step 825, voice model update module 160 builds keyword models for adaptation. In preferred embodiments of the present invention, pre-defined keyword and digit models are built in advance. Thus, only user-defined keywords models need to be built for adaptation in this step.

In step 830, adaptation module 161 performs an adaptation using the built-keyword models, new voice models and the accumulated personal acoustic data to generate adapted new voice models. In this step, the accumulated personal acoustic data is used as speech input by the adaptation module 161. This allows for adaptation of the new models to occur without the need for new speech input by the user.

In step 835, adapted new voice models are downloaded to VR device 200.

If, on the other hand, no accumulated personal acoustic data exists, in step 840, VKT 210 is uploaded into a memory in set-up device 100.

In step 845, voice model update module 160 builds keyword models using the new voice models. In preferred embodiments of the present invention, pre-defined keyword and digit models are built in advance. Thus, only user-defined keywords models need to be built for adaptation in this step.

In step 850, updated new voice models are downloaded to VR device 200.

Figure 10:
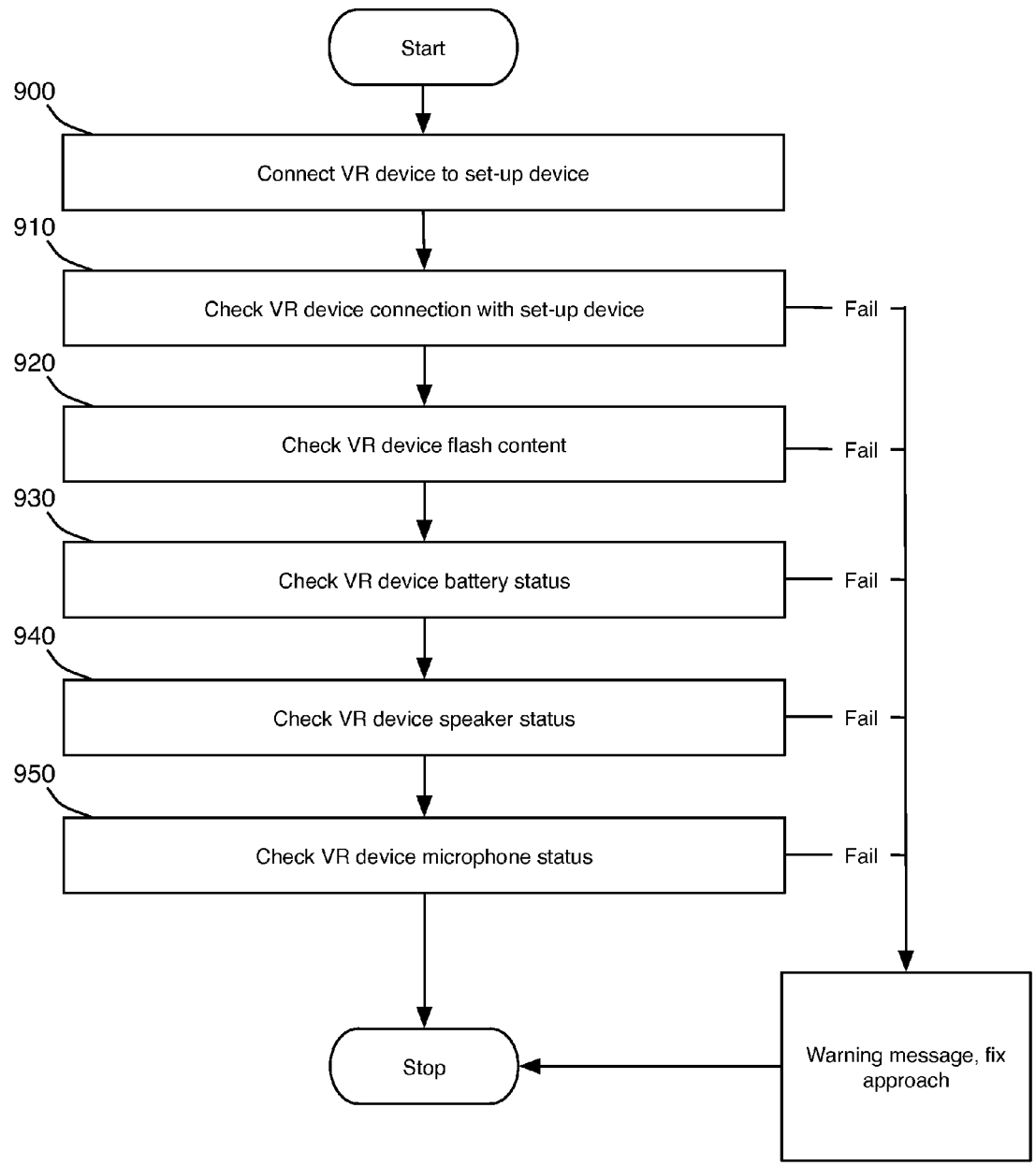
FIG. 10 is a flow diagram of a method of performing a diagnostic routine on the VR device according to an embodiment of the present invention.

FIG. 10 shows an exemplary flow diagram of a method of performing a diagnostic routine according to an embodiment of the present invention.

In step 900, the VR device 200 is connected to set-up device 100.

In step 910, diagnostics module 165 checks the connection between the VR device 200 and the set-up device 100.

In step 920, diagnostics module 165 checks the flash content of memory in which VR system 202 is stored.

In step 930, diagnostics module 165 checks the battery status of battery 250.

In step 940, diagnostics module 165 checks the functioning of speaker 230. In a preferred embodiment of the invention, a test prompt is transmitted to the VR device 200 and output through speaker 230. If the user hears the voice prompt, the user inputs a positive acknowledgement through input 130 of set-up device 100. Otherwise, the user inputs a negative acknowledgement through input 130 and the test is a fail.

In step 950, diagnostics module 165 checks the functioning of microphone 240. In a preferred embodiment of the invention, the user is prompted to speak into microphone 240. Based on the speaker input, microphone volume is optimized such that the audio input is neither saturated nor too small to be detected. In this regard, an echo test may be performed to obtain the optimized input volume of the microphone 240 and output volume of the speaker 230 by controller 201. If no input is detected, the test is a fail.

In preferred embodiments of the invention, the user is notified on display 120 of any failed test. Furthermore, where appropriate, fix approaches are provided to the user.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for improved voice recognition in a system having a set-up device and a voice recognition device, comprising the steps of:
   generating a Voice Keyword Table (VKT) and downloading the VKT to the voice recognition device;
   upgrading a voice recognition system on the voice recognition device; and
   modifying a voice model in the voice recognition device;
   wherein the VKT comprise visual form data, spoken form data, phonetic format data, and an entry corresponding to a keyword, and TTS generated voice prompts and voice models corresponding to the phonetic format data.

2. The method of claim 1, wherein the step of generating the VKT comprises the steps of:
   inputting visual form data and entry data;
   transforming visual form data to default spoken form data;
   mapping spoken form data to phonetic format; and
   performing TTS-guided-pronunciation editing to modify phonetic format data.

3. The method of claim 2, further comprising the step of performing a confusion test using the phonetic format data, voice models and a confusion table to identify keywords in a confusion set.

4. The method of claim 3, further comprising the step of editing spoken form data and mapping edited spoken form data to phonetic format data to eliminate keywords from the confusion set.

5. The method of claim 3, further comprising the step of adapting keywords to eliminate keywords from the confusion set.

6. A method for improved voice recognition in a system having a set-up device and a voice recognition device, comprising the steps of:
   generating a Voice Keyword Table (VKT) and downloading the VKT to the voice recognition device;
   upgrading a voice recognition system on the voice recognition device; and
   modifying a voice model in the voice recognition device;
      wherein the step of modifying the voice model in the voice recognition device comprises the steps of:
         building a keyword model from keywords in the VKT;
         selecting keywords for adaptation;
         obtaining new speech input for selected keywords;
         adapting voice models for selected keywords using existing keyword voice models and new speech input to produce adapted voice models; and
         downloading adapted speech models to the voice recognition device.

7. A method for improved voice recognition in a system having a set-up device and a voice recognition device, comprising the steps of:
   generating a Voice Keyword Table (VKT) and downloading the VKT to the voice recognition device;
   upgrading a voice recognition system on the voice recognition device; and
   modifying a voice model in the voice recognition device;
   wherein the step of modifying a voice model in the voice recognition device comprises the steps of:
      downloading a new voice model from a network to the set-up device;
      if the new voice model is a newer version than the voice model on the voice recognition device, determining if accumulated personal acoustic data exists;
      if accumulated personal acoustic data exists, uploading the VKT from the voice recognition device to the set-up device, building a keyword model for adaptation from keywords in the uploaded VKT, performing adaptation using the new voice model and accumulated personal data to produce an adapted new voice model, and downloading the adapted new voice model to the voice recognition device; and
      if no accumulated speech data exists, uploading the VKT to the set-up device, and building a keyword model for keywords in the uploaded VKT using the new voice model, and downloading the updated new voice model to the voice recognition device.

8. The method of claim 7, wherein the accumulated personal acoustic data is speech input recorded during user-initiated adaptation of voice models and stored on the set-up device.

9. The method of claim 7, wherein the accumulated personal acoustic data is speech input recorded during use of the voice recognition device to identify keywords and stored on the voice recognition device.

10. A method for improved voice recognition in a system having a set-up device and a voice recognition device, comprising the steps of:
    generating a Voice Keyword Table (VKT) and downloading the VKT to the voice recognition device;
    upgrading a voice recognition system on the voice recognition device;
    modifying a voice model in the voice recognition device;
    saving run-time information in the voice recognition device;
    uploading saved run-time information from the voice recognition device to the set-up device;
    processing run-time information on the set-up device; and
    updating the voice recognition device according to the results of the processing of run-time information on the set-up device to improve voice recognition performance.

11. A method for improved voice recognition in a system having a set-un device and a voice recognition device, comprising the steps of:
    generating a Voice Keyword Table (VKT) and downloading the VKT to the voice recognition device;
    upgrading a voice recognition system on the voice recognition device;
    modifying a voice model in the voice recognition device; and
    initiating a diagnostic test on the voice recognition device by the set-up device.

12. The method of claim 11, wherein the diagnostic test further comprise a step of generating a user alert when voice recognition device hardware is not functioning properly.

13. The method of claim 11, wherein the diagnostic test further comprises a step of optimizing a microphone volume and a speaker volume on the voice recognition device.

14. The method of claim 11, wherein the step of initiating a diagnostic test further comprises a step of testing the connection between the set-up device and the voice recognition device.

15. A voice recognition system installed on a set-up device for improving voice recognition on a voice recognition device comprising:

a Voice Keyword Table (VKT) generating means for generating a VKT and downloading the VKT to the VKT to the voice recognition device; and means for updating voice models on the voice recognition device;

wherein the VKT comprises visual form data, spoken form data, phonetic format data, and an entry corresponding to a keyword, and TTS-generated voice prompts and voice models corresponding to the phonetic format data.

16. The voice recognition system of claim 15, further comprising means for performing a confusion test to identify keywords in a confusion set.

17. A voice recognition system installed on a set-up device for improving voice recognition on a voice recognition device comprising:

a Voice Keyword Table (VKT) generating means for generating a VKT and downloading the VKT to the VKT to the voice recognition device;

means for updating voice models on the voice recognition device; and means for updating the voice recognition device according to the results of the processing of run-time information saved on the voice recognition device to improve voice recognition performance.

18. A voice recognition system installed on a set-up device for improving voice recognition on a voice recognition device comprising:

a Voice Keyword Table (VKT) generating means for generating a VKT and downloading the VKT to the VKT to the voice recognition device;

means for updating voice models on the voice recognition device; and means for initiating a diagnostic test on the voice recognition device.

19. An apparatus for improved voice recognition, comprising:

a set-up device comprising a first Voice Keyword Table (VKT) and a first voice recognition system; and a voice recognition device comprising a second VKT corresponding to the first VKT and a second voice recognition system, the voice recognition device connectible to the set-up device through an interface;

wherein the first VKT and the second VKT comprise visual format data, spoken form data, phonetic format data, and an entry corresponding to a keyword, and TTS-generated voice prompts and voice models corresponding to the phonetic format data.

* * * * *